US011029247B2

(12) United States Patent
Major et al.

(10) Patent No.: US 11,029,247 B2
(45) Date of Patent: Jun. 8, 2021

(54) INFRARED CIE METHODOLOGY FOR CHEMICAL GROUP CLASSIFICATION

(71) Applicant: The Government of the United States of America, as represented by the Secretary of the Navy, Arlington, VA (US)

(72) Inventors: Kevin Major, Alexandria, VA (US); Kenneth J. Ewing, Edgewood, MD (US); Jasbinder S. Sanghera, Ashburn, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/571,461

(22) Filed: Sep. 16, 2019

(65) Prior Publication Data
US 2020/0124524 A1 Apr. 23, 2020

Related U.S. Application Data

(60) Provisional application No. 62/749,143, filed on Oct. 23, 2018.

(51) Int. Cl.
*G01N 21/35* (2014.01)
*G01J 3/51* (2006.01)
*G01J 3/52* (2006.01)

(52) U.S. Cl.
CPC ............... *G01N 21/35* (2013.01); *G01J 3/51* (2013.01); *G01J 3/52* (2013.01)

(58) Field of Classification Search
CPC .... G01N 21/35; G01N 21/3504; G01N 21/65; G01N 2201/1293; G01J 3/51; G01J 3/52; G01J 3/44; G01J 3/28
(Continued)

(56) References Cited

U.S. PATENT DOCUMENTS 4,975,581 A * 12/1990 Robinson ............. A61B 5/6884
250/339.09
5,424,545 A * 6/1995 Block ................. A61B 5/14532
250/343

(Continued)

OTHER PUBLICATIONS

Major, Kevin J. et al., Biomimetic Optical-Filter Detection System for Discrimination of Chemical Signatures, Analytical Chemistry, Nov. 10, 2016, pp. 11491-11497, vol. 88, American Chemical Society, Washington, DC, USA.
(Continued)

*Primary Examiner* — Isiaka O Akanbi
(74) *Attorney, Agent, or Firm* — US Naval Research Laboratory; Suresh Koshy

(57) ABSTRACT

The apparatus includes a standard computer processor in operation receiving a plurality of stimulus-value signals. The apparatus includes a standard computer-readable medium storing instructions that, when executed by the processor, cause the processor to carry out a method for identifying at least one chemical of interest. The method includes the following. A chromaticity chart including a plurality of chemical groupings is generated. The at least one chemical of interest is classified as belonging to a respective chemical grouping of the plurality of chemical groupings based on the chromaticity chart and the plurality of stimulus-value signals. Optionally, the chromaticity chart includes a molecular vibrational chart.

9 Claims, 13 Drawing Sheets

(58) Field of Classification Search
USPC .............. 356/433, 318–319, 326, 402, 436
See application file for complete search history.

(56) References Cited

U.S. PATENT DOCUMENTS

| | | | | |
|---|---|---|---|---|
| 8,406,859 | B2* | 3/2013 | Zuzak | G01J 3/2803 600/476 |
| 9,857,295 | B2 | 2/2018 | Poutous et al. | |
| 2003/0058441 | A1* | 3/2003 | Shakespeare | G01J 3/42 356/319 |
| 2007/0153277 | A1* | 7/2007 | Shakespeare | G01J 3/501 356/402 |
| 2007/0153278 | A1* | 7/2007 | Shakespeare | G01N 21/86 356/402 |
| 2007/0279629 | A1* | 12/2007 | Grun | G01J 3/44 356/318 |
| 2009/0141961 | A1* | 6/2009 | Smith | G07D 7/1205 382/135 |
| 2011/0290036 | A1* | 12/2011 | Pflum | H03K 3/356121 73/861.08 |
| 2012/0098924 | A1* | 4/2012 | Busch | G06T 7/194 348/36 |
| 2017/0045442 | A1* | 2/2017 | Poutous | G01N 21/3504 |
| 2019/0063215 | A1* | 2/2019 | Dai | G06N 3/08 |

OTHER PUBLICATIONS

Anderson, Casper F. et al., Estimating Individual Cone Fundamentals from Their Color-matching Functions, Journal of the Optical Society of America A, Jul. 21, 2016, pp. 1579-1588, vol. 33, No. 8, Optical Society of America, Washington, DC, USA.

Poutous, Menelaos K. et al., Comparative Discrimination Spectral Detection Method for the Identification of Vapors Using Overlapping Broad Spectral Filters, Applied Spectroscopy, Mar. 1, 2015, pp. 305-313, vol. 69, No. 3, Society for Applied Spectroscopy, New Market, MD, USA.

Thornhill, N.F. et al., Spectral Principal Component Analysis of Dynamic Process Data, Control Engineering Practice, Aug. 2002, pp. 833-846, vol. 10, Elsevier Science Ltd., Oxford, UK.

Hibbert, D.B. et al., An Introduction to Bayesian Methods for Analyzing Chemistry Data Part II: A Review of Applications of Bayesian Methods in Chemistry, Chemometrics and Intelligent Laboratory Systems, Apr. 2, 2009, pp. 211-220, vol. 97, Elsevier B.V., Amsterdam, Netherlands.

Dalton, J. Brad et al., Identification of Spectrally Similar Methods Using the USGS Tetracorder Algorithm: The Calcite-Epidote-Chlorite Problem, Remote Sensing of Environments, Feb. 2004, pp. 455-466, vol. 89, Elsevier Inc., Oxford, UK.

Smith, T. et al., The C.I.E. Colorimetric Standards and Their Use, Transactions of the Optical Society, Jan. 1931, pp. 73-134, vol. 33, No. 3, IOP Publishing, Bristol, UK.

\* cited by examiner

INFRARED CIE METHODOLOGY FOR CHEMICAL GROUP CLASSIFICATION

CROSS-REFERENCE TO RELATED APPLICATIONS

This application claims priority to U.S. Provisional Patent Application Ser. No. 62/749,193, entitled "INFRARED COLOR VISION," to Major et al., which was filed on 23 Oct. 2018 and is incorporated herein by reference.

STATEMENT REGARDING FEDERALLY SPONSORED RESEARCH OR DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; techtran@nrl.navv.mil, referencing NC 108342-US3.

BACKGROUND OF THE INVENTION

Field of the Invention

This invention relates in general to an apparatus for classifying a chemical of interest, and in particular to an apparatus for classifying a chemical of interest using, for example, molecular vibrational chromaticity charts that mimic human color vision.

Description of the Related Art

Human color vision results from the interaction of retinal photopigments with reflected or transmitted visible light. In 1931, the International Commission on Illumination ("CIE") developed the CIE color-matching chart to map human color vision by separating different colors based on the interaction of their spectral profiles with three retinal photopigments found in the human eye.

Applicant is unaware of any example in nature of infrared ("IR") color vision analogous to visible color vision. Some animals are capable of a form of IR vision. However, their mechanism for IR vision is very different from the mechanism of human color vision, as these vision modalities use a broadband, non-specific approach to detect heat from prey and predators.

BRIEF SUMMARY OF THE INVENTION

IR color vision or Raman color vision, according to one or more embodiments of the invention and operating by the same mechanism as visible human color vision, enable discrimination of hazardous materials, such as explosives, chemical warfare agents, or pollutants from benign materials in the environment.

In an embodiment of the invention, a CIE-Infrared ("CIE-IR") chart has been generated, which enables the separation of different chemicals (analogous to separation of different colors in the visible) based on the interaction of their IR signatures with three different IR optical filters, instead of the retinal photopigments in the human eye. The ability to discriminate between differences in various chemicals based on the interaction of a chemical's IR absorption properties and specific IR filters is highlighted by the position of different chemicals and mixtures of chemicals on the CIE-IR chart. These results demonstrate that the CIE-IR chart enables separation of different classes of chemicals, as the visible CIE chart does with visible colors, except in the IR spectral region. An embodiment of the invention uses the generated CIE-IR chart to classify a chemical of interest using infrared or Raman color vision.

BRIEF DESCRIPTION OF THE DRAWINGS

FIG. 6A is a full CIE-IR chart, expanded center 'white light' region with the noise of the system calculated as 3σ (individual 'white light' points being plotted as asterisks). More specifically, FIG. 6B is an expanded region of the CIE-IR chart highlighting the training data for the inkjet-printed samples.

DETAILED DESCRIPTION OF THE INVENTION

Figure 1:
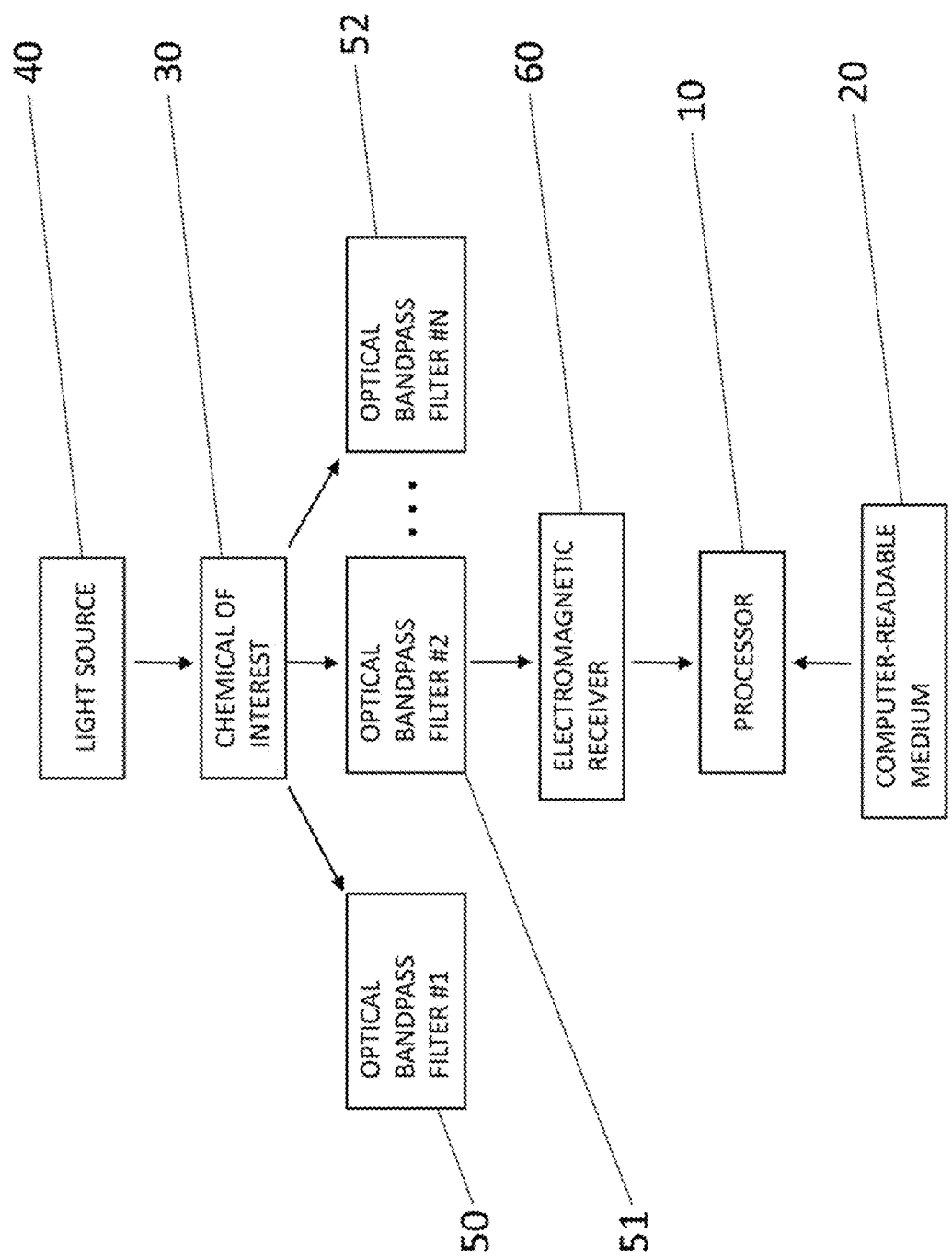
FIG. 1 is an embodiment of an apparatus according to an embodiment of the invention including a plurality of optical bandpass filters.
Figure 2:
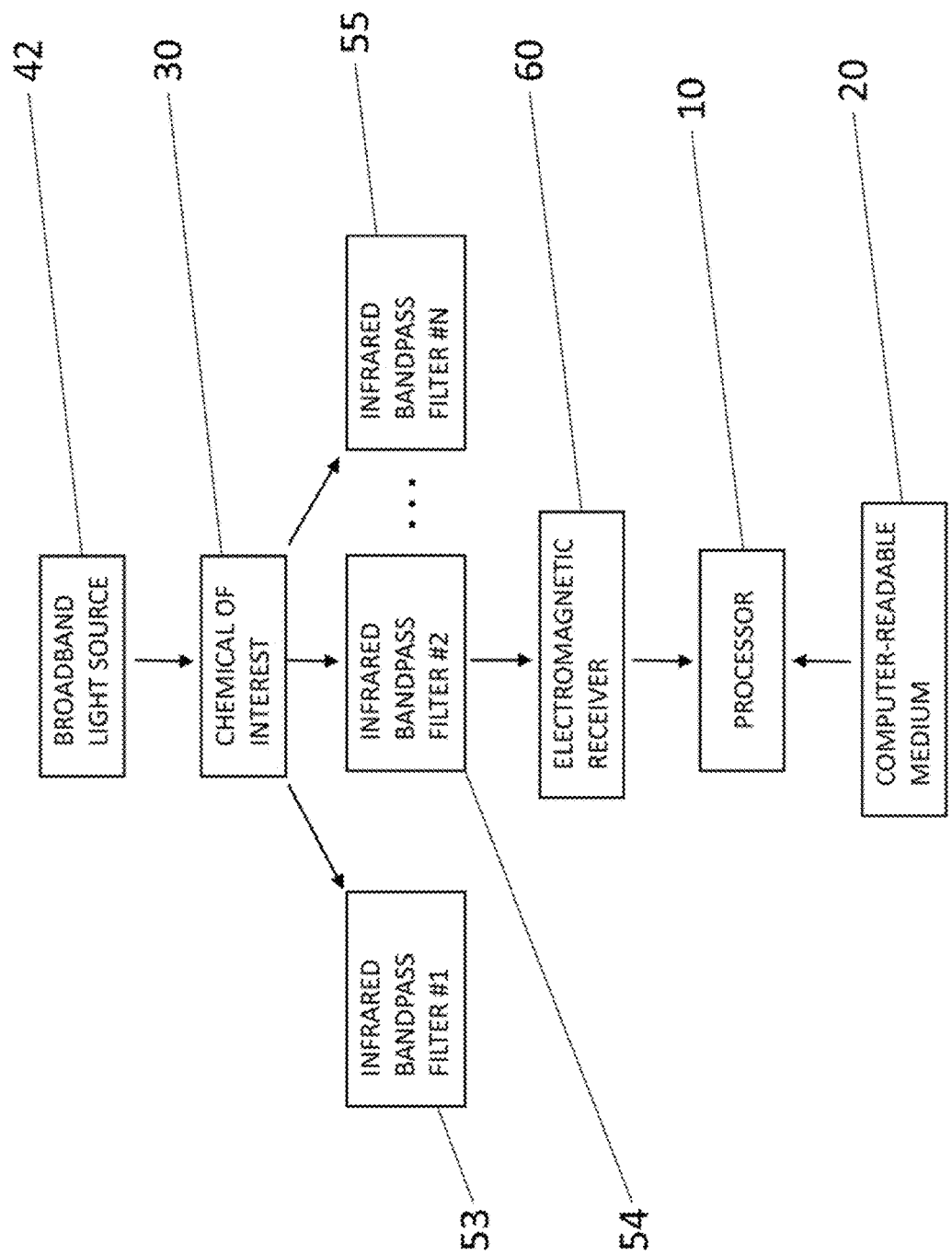
FIG. 2 is an embodiment of an apparatus according to another embodiment of the invention including a plurality of optical bandpass filters.
Figure 3:
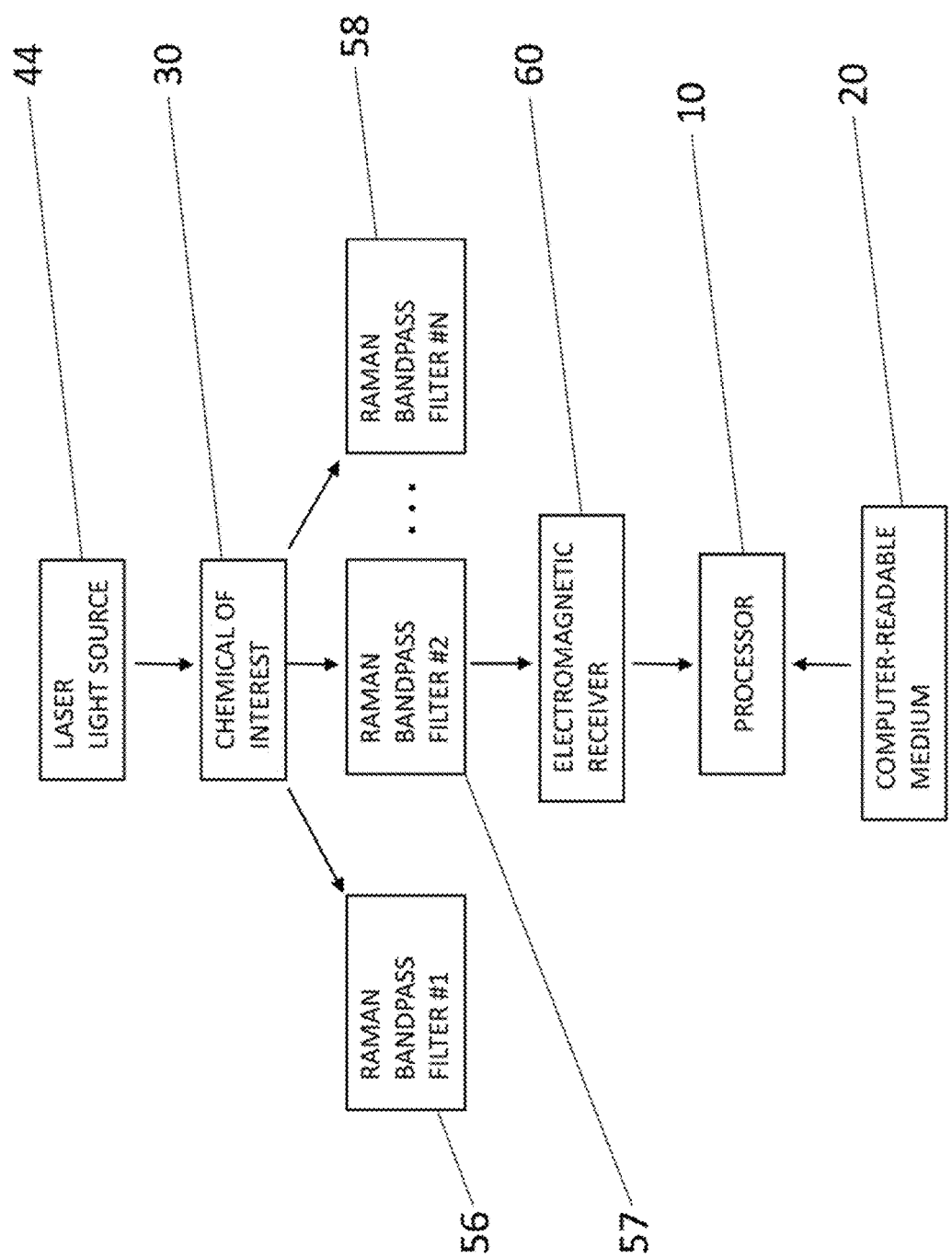
FIG. 3 is an embodiment of an apparatus according to another embodiment of the invention including a plurality of optical bandpass filters.

An embodiment of the invention includes an apparatus, and is described as follows with reference to FIGS. 1-3. The apparatus includes a standard computer processor 10 in operation receiving a plurality of stimulus-value signals. The apparatus includes a standard computer-readable medium 20 storing instructions that, when executed by the processor 10, cause the processor to carry out a method for identifying at least one chemical of interest 30. The method includes the following. A chromaticity chart including a plurality of chemical groupings is generated. At least one chemical of interest is classified as belonging to a respective chemical grouping of the plurality of chemical groupings based on the chromaticity chart and the plurality of stimulus-value signals.

Vibrational spectroscopy concerns transitions due to absorption or emission of electromagnetic radiation. These transitions, originate from the vibration of nuclei constituting the molecules. A chemical bond in a molecule can vibrate in at least two ways. Two types of molecular vibrations include a stretching vibration and a bending (or rotational) vibration. A stretching vibration is characterized by movement along the bond axis with increasing or decreasing of the interatomic distances. A bending vibration is characterized by a change in bond angles with respect to the remainder of the molecule. Standard spectroscopic techniques capable of probing the vibrational characteristics of molecules/materials include standard Raman spectroscopy, standard IR spectroscopy (e.g., near-IR spectroscopy and Far-IR spectroscopy) and standard terahertz spectroscopy. Optionally, the chromaticity chart according to the instant invention includes a molecular vibrational chromaticity chart. For the purpose of this patent application, the term of art "molecular vibrational chromaticity chart" means an analog to the standard visible light CIE chart, wherein electromagnetic radiation of wavelengths that correspond to the molecular vibrations of chemicals instead of visible light is used, and wherein such molecular vibrations include stretching vibrations or bending vibrations. Optionally, the molecular vibrational chromaticity chart includes a plurality of infrared ("IR") molecular vibrational signatures of a plurality of target chemicals, a plurality of Raman molecular vibrational signatures of the plurality of target chemicals, or a plurality of terahertz molecular vibrational signatures of the plurality of target chemicals. For the purpose of this patent application, the term of art "molecular vibrational signature" means the characteristic vibrational frequencies associated with a particular molecule or grouping of molecules, for example, as interrogated by a radiative source.

Optionally, the apparatus further includes a standard light source 40, which in operation illuminates the chemical of interest 30. The apparatus further includes at least three standard optical bandpass filters 50, 52, 53 with spectral overlap sufficient to generate the molecular vibrational chromaticity chart. The at least three standard optical bandpass filters 50, 52, 53 in operation receive light reflected from and/or transmitted through the chemical of interest 30. Although FIG. 1, for example, shows only three bandpass filters, one of ordinary skill in the art will readily appreciate that the ellipses between the bandpass filters 50, 51 and the bandpass filter #N 52 indicate that more than three bandpass filters are included in alternative embodiments of the invention. (In practice, this light is compared to the signal collected by the electromagnetic receiver discussed below, when no chemical of interest is present for each active electromagnetic radiation source in sequence). The chemical of interest 30 includes a plurality of chemical vibrational absorption-emission bands. For the purpose of this patent application, the term of art "chemical vibrational absorption-emission bands" means chemical vibrational absorption bands and/or chemical vibrational emission bands. The at least three optical bandpass filters 50, 52, 53 have at least three unique respective spectral response profiles. The plurality of stimulus-value signals are based on the at least three respective spectral responses and the plurality of chemical vibrational absorption-emission bands. More specifically, for the purpose of this patent application, the term of art "stimulus-value signals" means an integrated response between a molecular vibrational signature of a chemical and a spectral response of an optical bandpass filter in the embodiment of the invention including bandpass filters and means an integrated response between a molecular vibrational signature of a chemical and a spectral response of an active polychromatic source in the embodiment of the invention including active polychromatic sources, as discussed below. The apparatus further includes at least one standard electromagnetic receiver 60, which in operation collects spectral response profiles from the at least three bandpass filters 50, 52, 53 and the processor 10. The at least three optical bandpass filters 50, 52, 53 transmits the plurality of stimulus-value signals to the at least one electromagnetic receiver 60. The at least one electromagnetic receiver 60 transmits the plurality of stimulus-value signals to the processor 10. Optionally, the light source includes a broadband light source 42 or a laser light source 44.

Optionally, the generating a chromaticity chart includes the following. At least three vibrational-color-matching functions are provided. The at least three vibrational-color-matching functions include at least three respective weighted linear transforms of the plurality of stimulus-value signals. For the purposes of this patent application, the term of art "weighted linear transforms" also includes linear transforms with an overall weighting of '1'; that is, in such an embodiment of the invention, the at least three vibrational-color-matching functions include at least three respective unweighted linear transforms of the plurality of stimulus-value signals. Also, the plurality of chemical groupings is generated based on the at least three vibrational-color-matching functions. Optionally, generating the plurality of chemical groupings based on the at least three vibrational-color-matching functions includes the following. A plurality of molecular vibrational chromaticity regions is generated respectively corresponding to the plurality of chemical groupings. The plurality of chemical groupings and/or the at least three respective weighted linear transforms are adjusted until the plurality of molecular vibrational chromaticity regions correspondingly include a plurality of target chemicals. Optionally, the vibrational-color-matching functions receive as inputs the plurality of stimulus-value signals. The vibrational-color-matching functions output a plurality of vibrational chromaticity coordinates. Optionally, the classifying the chemical of interest as belonging to a respective chemical grouping of the plurality of chemical groupings includes the following. A respective molecular vibrational chromaticity region of the plurality of molecular vibrational chromaticity regions is determined based on the plurality of vibrational chromaticity coordinates. The respective chemical grouping of the plurality of chemical groupings is determined based on the respective molecular vibrational chromaticity region of the plurality of molecular vibrational chromaticity regions.

Optionally, the at least three optical bandpass filters 50, 52, 53 include at least three standard IR bandpass filters or at least three standard near IR or visible bandpass filters for Raman spectroscopic applications.

Figure 4:
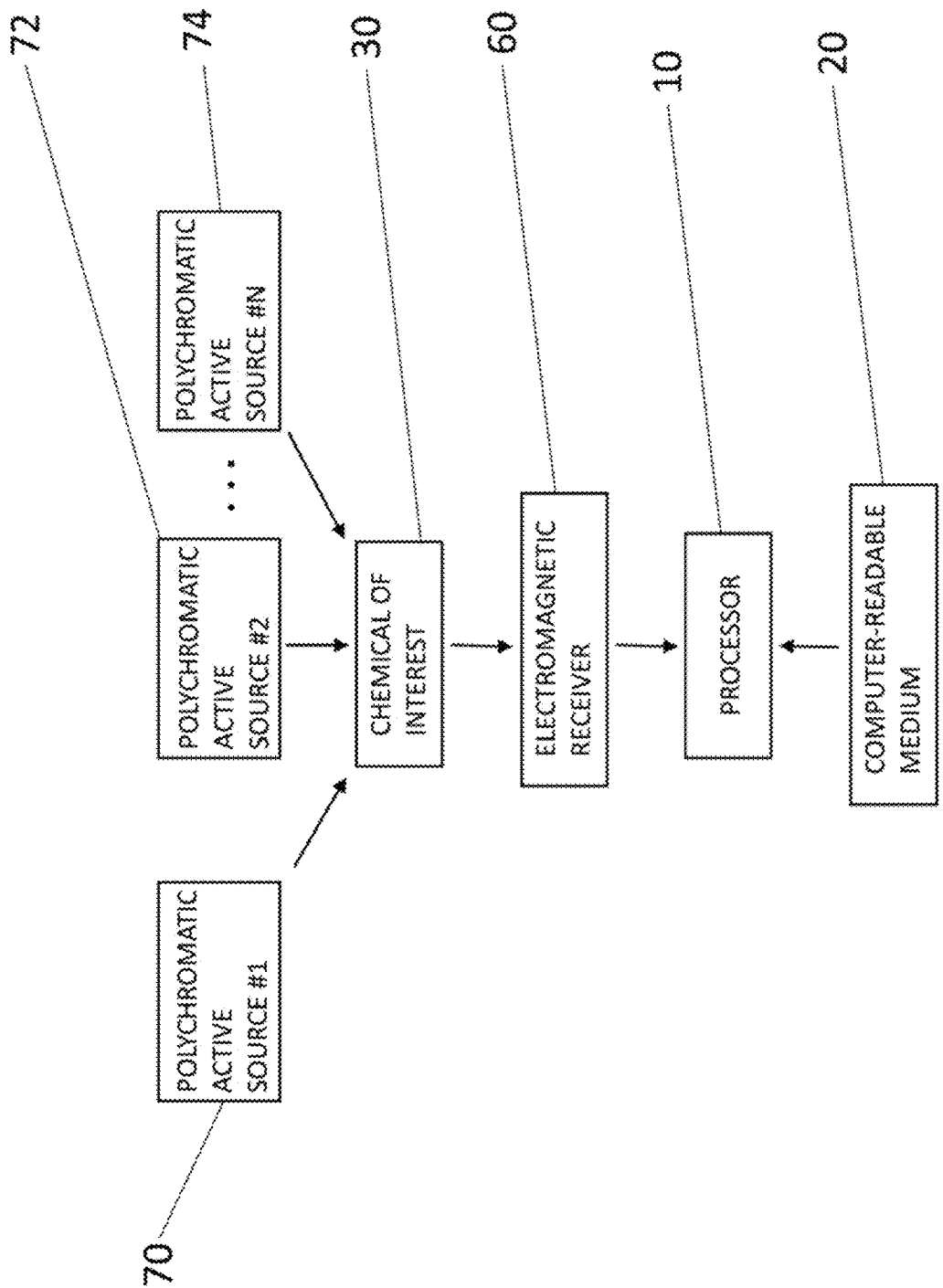
FIG. 4 is an embodiment of an apparatus according to an embodiment of the invention including a plurality of polychromatic active sources.
Figure 5:
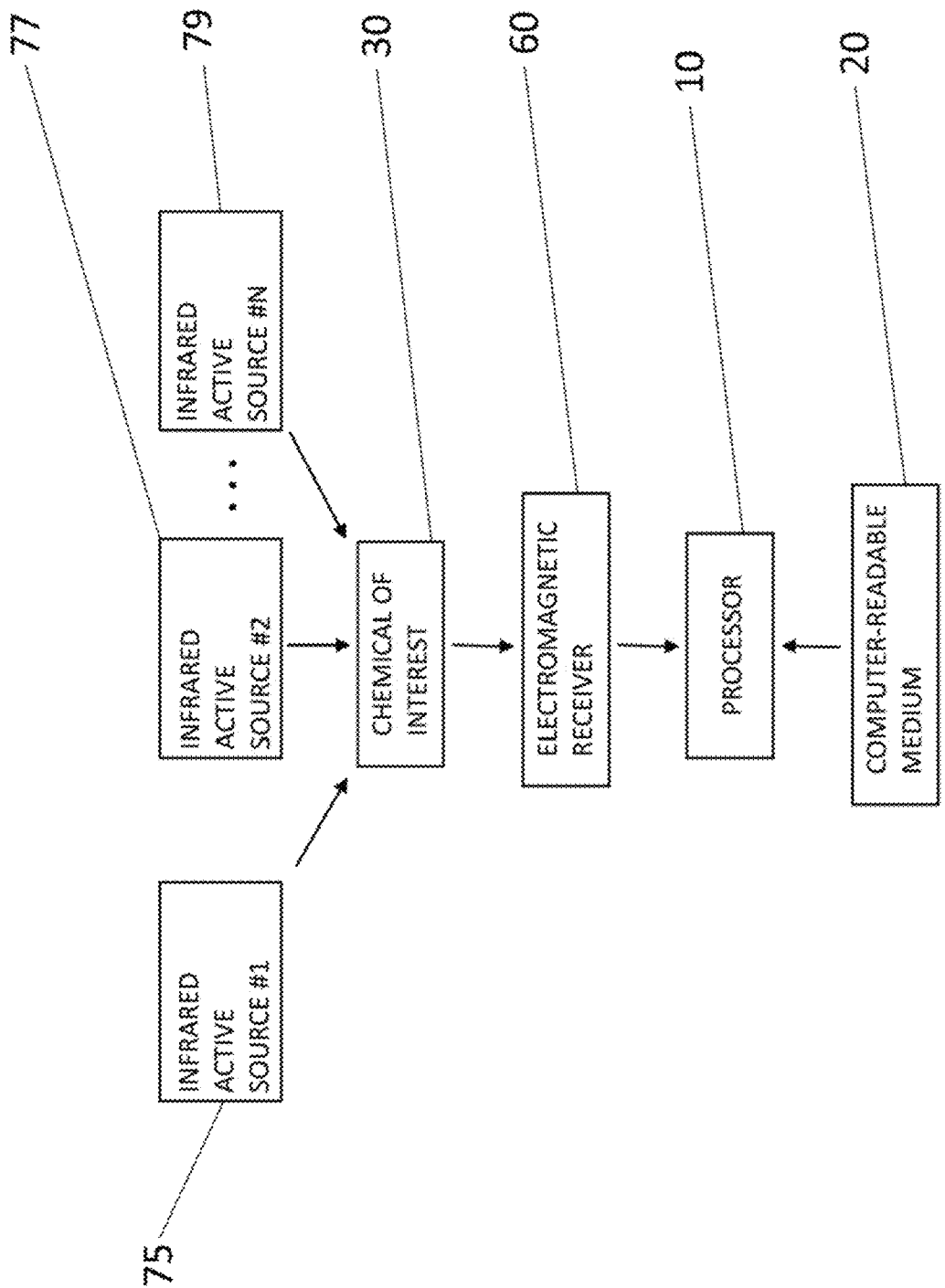
FIG. 5 is an embodiment of an apparatus according to another embodiment of the invention including a plurality of polychromatic active sources.

Mother embodiment of the invention is described as follows with reference to FIGS. 4-5. In this alternative embodiment of the invention, the apparatus includes at least three broadband, overlapping standard active polychromatic sources 70, 72, 74, which in operation illuminate the chemical of interest. Although FIG. 4, for example, show only three active sources, one of ordinary skill in the art will readily appreciate that the ellipses between the active sources 70, 72 and the active source #N 74 indicate that more than three active sources are included in alternative embodiments of the invention. The at least three sources 70, 72, 74 includes at least three respective spectral responses. The apparatus further includes a standard electromagnetic receiver 60, which in operation receives light reflected from and/or transmitted through the chemical of interest. (For example, this light is compared to the signal collected by the electromagnetic receiver, when no chemical of interest is present for each active electromagnetic radiation source in sequence). The chemical of interest includes a plurality of chemical vibrational absorption-emission bands. The plurality of stimulus-value signals is based on the at least three respective spectral responses and the plurality of chemical vibrational absorption-emission bands. The electromagnetic receiver 60, in operation transmits the plurality of stimulus-value signals to the processor 10. Optionally, the at least three respective spectral responses comprise respective spectral widths each greater than 10 wavenumbers. Optionally, the at least three active sources include at least three standard IR active sources 75, 77, 79.

Optionally, the chemical of interest includes chemical vibrational absorption-emission bands. The generating a chromaticity chart includes the following. At least three vibrational-color-matching functions are provided. The at least three vibrational-color-matching, functions includes at least three respective weighted linear transforms of the plurality of stimulus-value signals. The plurality of chemical groupings is generated based on the at least three vibrational-color-matching functions. The generating the plurality of chemical groupings based on the at least three vibrational-color-matching functions includes the following. A plurality of molecular vibrational chromaticity regions respectively corresponding to the plurality of chemical groupings is generated. The plurality of chemical groupings and/or the at least three respective weighted linear transforms is adjusted until the plurality of molecular vibrational chromaticity regions correspondingly include a plurality of target chemicals. Optionally, the vibrational-color-matching functions receive as inputs the plurality of stimulus-value signals. The vibrational-color-matching functions outputs a plurality of vibrational chromaticity coordinates. Optionally, the classifying the chemical of interest as belonging to a respective chemical grouping of the plurality of chemical groupings include the following. A respective molecular vibrational chromaticity region of the plurality of molecular vibrational chromaticity regions is determined based on the plurality of vibrational chromaticity coordinates. The respective chemical grouping of the plurality of chemical groupings is determined based on the respective molecular vibrational chromaticity region of the plurality of molecular vibrational chromaticity regions.

An embodiment of the invention employs IR color vision, which mimics human color vision, utilizing three broadband overlapping IR optical filters instead of retinal photopigments, to discriminate between chemicals based on their IR signatures. In order to demonstrate the IR color vision mimic, an IR equivalent of the visible CIE chart has been developed, the CIE-IR chart. To understand the correlation between the visible CIE and CIE-IR charts consider the following metaphor. Envision that all explosives manifest as a shade of red, such that the explosive RDX is garnet, the explosive HMX is scarlet and the explosive PETN is rose. Then, envision that a class of benign chemicals, for instance sugars, all manifest as a shade of blue such that sucrose is navy, while fructose is azure. Rather than uniquely identifying the garnet RDX or the scarlet HMX as an explosive versus the navy colored sucrose, the CIE-IR approach simply distinguishes a 'red colored' explosive from a 'blue colored' sugar. Thus, in the way that the human eye discriminates red berries from a green background or identifies a brightly colored hazardous animal, the CIE-IR approach readily discriminates one chemical class from another.

The first step to develop the CIE-IR chart is identifying three IR optical filters, analogous to the three photopigments in the human eye, which enable greater separation between target and background chemicals on the CIE-IR chart. Such filters are selected by any number of standard global and/or local optimization means. For example, a standard simulated annealing optimization approach is employed. A weighting matrix is applied to these selected filter functions to enhance the separation between the chemical classes of interest. This is modeled on the 1976 transformation of the CIE chart, which better distributes colors across the chart area. Thus, rather than a single optimization loop, a nested simulated annealing is employed so both the filters and weighting matrix are optimized.

The optimization results in three spectral filter profiles which define a chemical's stimulus value signals. For the embodiment here, three stimulus value signals are defined (X, Y, Z) based on the interaction of incoming IR light with the chemical's IR properties, and the three spectral filter profiles. Using the standard CIE convention, x, y coordinates are calculated and plotted on the CIE-IR chart according to Equation 1.

$$x = \frac{X}{X+Y+Z};$$
$$y = \frac{Y}{X+Y+Z}$$

Eqn. 1

Regions between the various chemical classes are assigned on the CIE-IR chart to separate between the chemicals. For these studies, a CIE-IR chart capable of separating hazardous materials (e.g., the explosive RDX, and explosive component ammonium nitrate ("AN")), from benign materials (e.g., table sugar, roughened delrin plastic, and cotton fabric) is demonstrated.

Figure 6A:
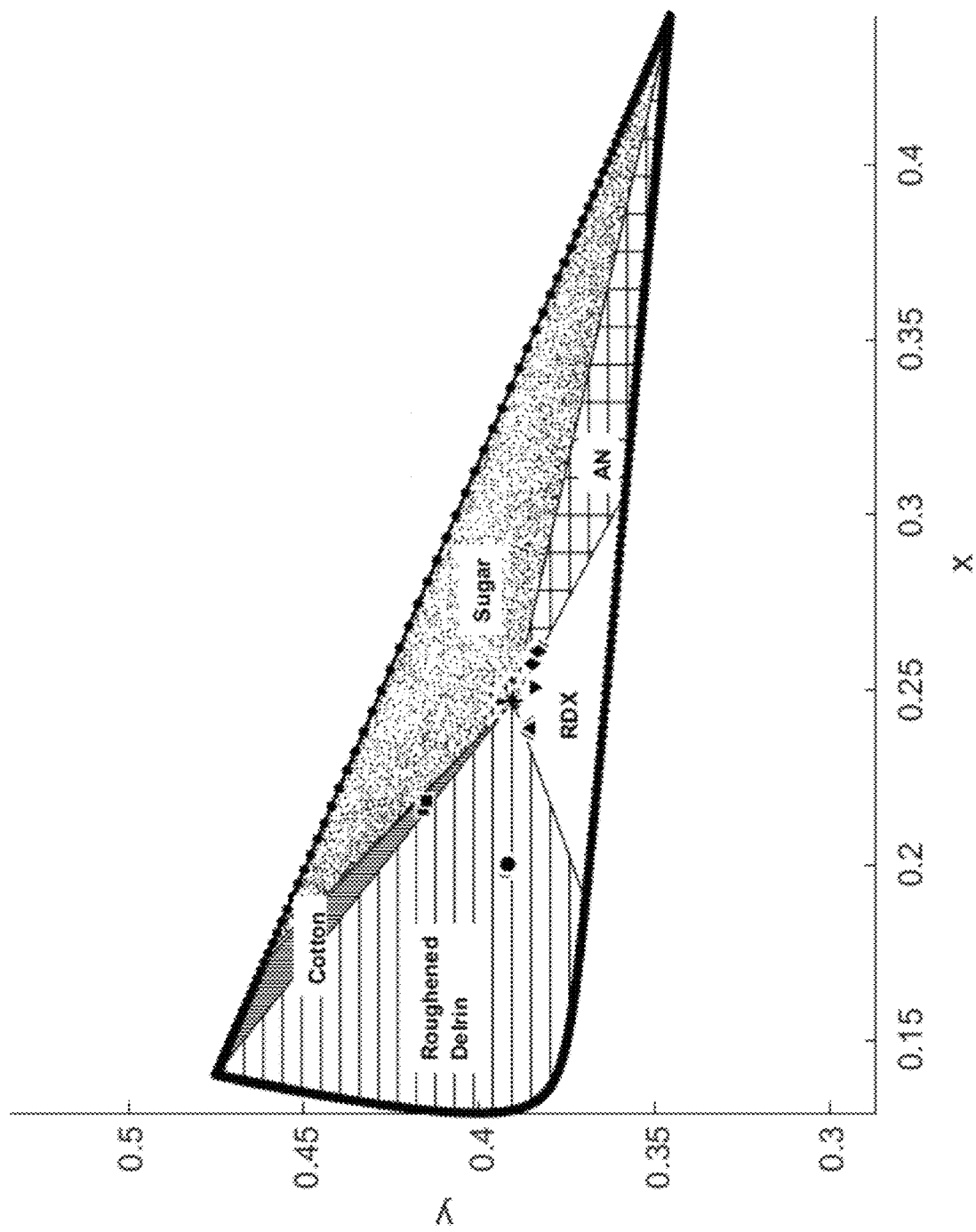
FIGS. 6A and 6B depict CIE-IR charts with classification regions corresponding to the explosive RDX (white, no markings), ammonium nitrate (AN) (cross-hatched), sugar (speckled), cotton (vertical lines), and roughened delrin (horizontal lines). Markers, given in $\mu g/cm^2$, indicate the training data points used, e.g., 400 $\mu g/cm^2$ RDX on delrin (upward pointing triangles), 400 $\mu g/cm^2$, RDX on aluminum (downward pointing triangles), 500 $\mu g/cm^2$ AN on aluminum (diamonds), 100 $\mu g/cm^2$ sugar on aluminum (pentagrams), cotton fabric swatch (squares), and roughened delrin substrate (circles). These numerical markers in the charts are not to be confused with any reference numerals identifying various components of various embodiments of the invention. More specifically.
Figure 6B:
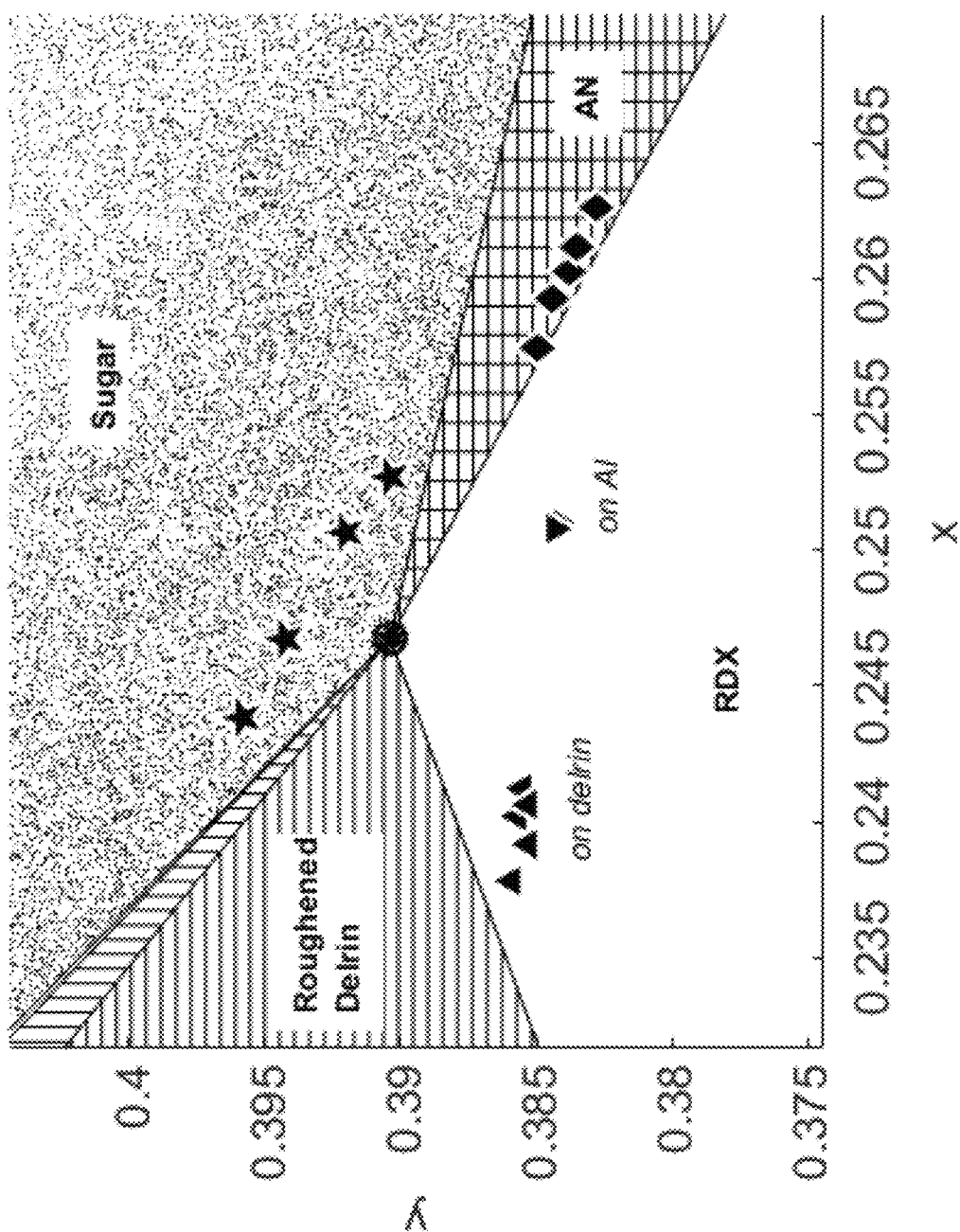

The resultant CIE-IR chart using training data is shown in FIGS. 6A-6B. The full CIE-IR chart shown in FIG. 6*a* shows the five defined classification regions, two for the hazardous chemicals RDX and AN, and one for each benign material. The training data used to develop the CIE-IR chart are shown, for example, as individual points within each region.

The 'white light' or noise region of the CIE-IR chart is defined using a standard diffuse Au reference spectrum. For example, five measurements collected across the Au standard are shown as black points (i.e., the asterisks). Using standard analysis, the noise of the system is calculated as 3× the standard deviation of these five measurements (i.e., the shaded black circle). The center of the CIE-IR chart is expanded in FIG. 6b in order to show the positions of the training data points for RDX, AN, and sugar.

Significantly, the classification region for RDX on the CIE-IR chart incorporates the training data points for samples of 400 ng/cm$^2$ RDX inkjet-printed on roughened delrin (i.e., the downward facing triangles) and aluminum (i.e., the upward facing triangles) substrates, even though the two substrates exhibit different spectral properties due to different surface optical properties. For example, RDX on roughened delrin exhibits strong transflection, and thus the resulting spectra exhibit spectral components from both RDX and the underlying delrin, while RDX on aluminum exhibit similar spectral features as diffuse IR reflectance spectra of powdered RDX. The RDX on delrin training data points are closer to the roughened delrin region than the RDX on aluminum training data points are, as expected based on spectral mixing. However, the CIE-IR chart clearly separates the RDX on delrin data points from the delrin classification region of the CIE-IR chart. This demonstrates the strength of the CIE-IR methodology, which groups complex spectral data into the same region/class, regardless of the spectral interaction between the target chemical and substrate.

Figure 7A:
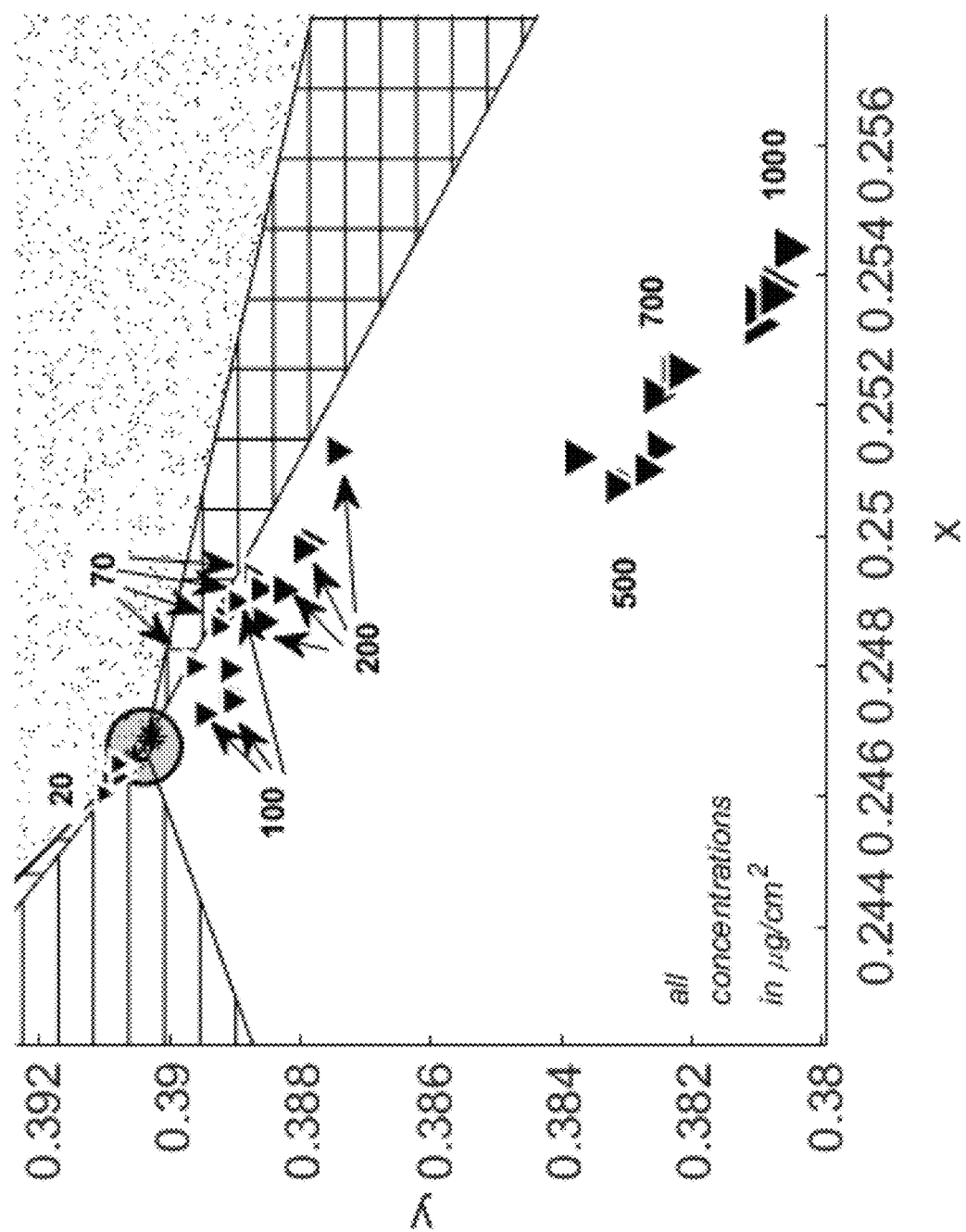
FIG. 7A depicts an expanded CIE-IR chart with RDX test data plotted (downward facing triangles). The size of the markers decreases with decreasing RDX concentration. Five data points for each sample of RDX with concentrations of 1000, 700, 500, 200, 100, 70, and 20 $\mu g/cm^2$ RDX are plotted and labeled by numerical markers 1000, 700, 500, 200, 100, 70, and 20. These numerical markers in the charts are not to be confused with any reference numerals identifying various components of various embodiments of the invention.

Classification of test data is also demonstrated using the CIE-IR chart. To begin, varying concentrations of RDX inkjet printed on aluminum are examined, over five separate regions on the aluminum coupon. Results for samples of RDX on aluminum at concentrations of 20, 70, 100, 200, 500, 700 and 1000 µg/cm$^2$ are shown on the expanded CIE-IR chart, as shown in FIG. 7A. These results show that RDX samples between 70-1000 µg/cm$^2$ are correctly classified. As the concentration of RDX decreases, the absorption bands decrease in strength and thus the corresponding CIE-IR points moves towards the 'white light' point.

Figure 7B:
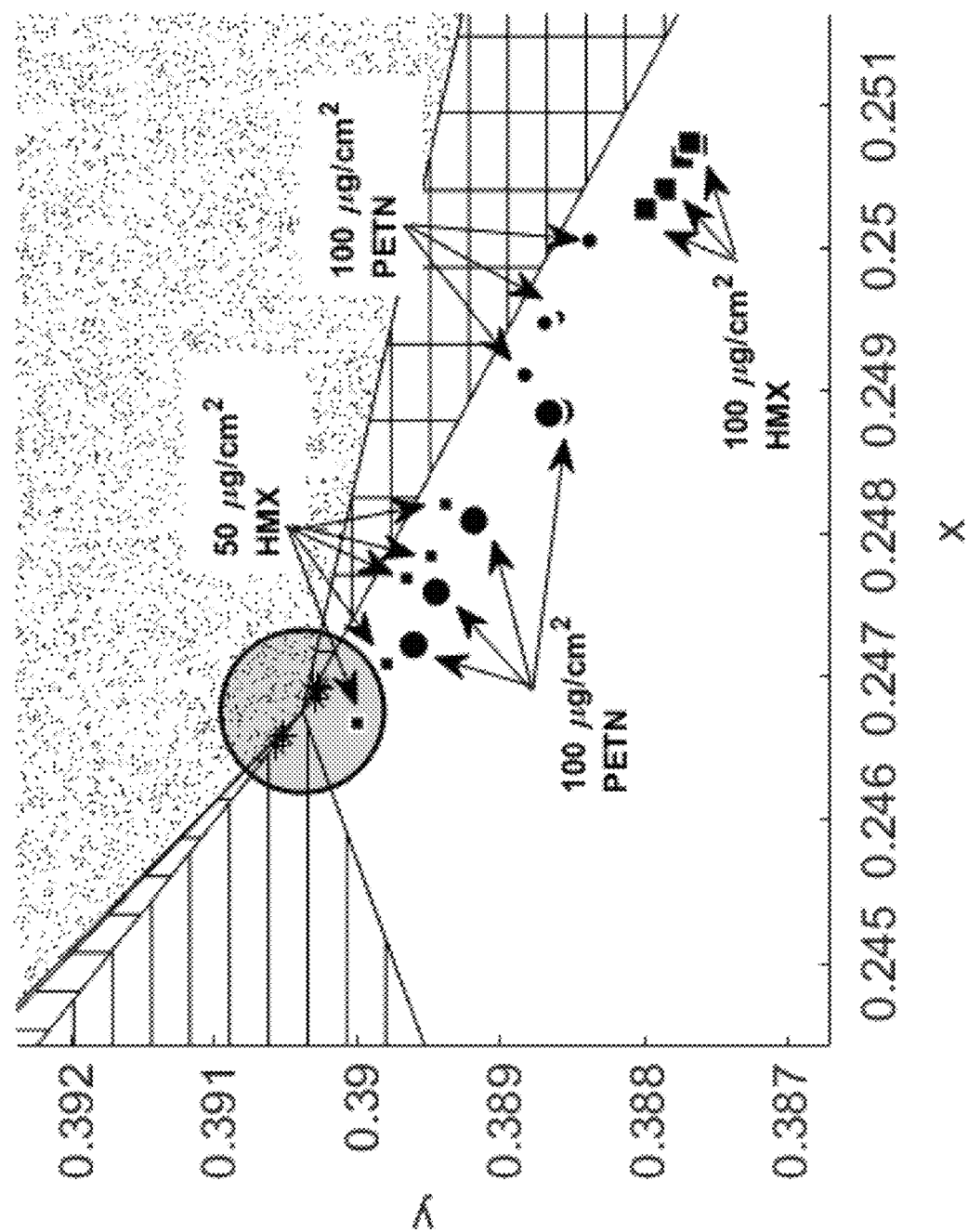
FIG. 7B depicts an expanded CIE-IR chart with additional explosive and interferent test data plotted. Circles (indicating PETN), and squares (indicating HMX), are used to indicate the two chemicals, while the larger points indicate the 100 $\mu g/cm^2$ and the smaller points indicate the 50 $\mu g/cm^2$ samples for each chemical.

Additional hazardous explosive materials, HMX and PETN, which the CIE-IR chart is not explicitly trained for, is then evaluated using the CIE-IR chart, as shown in FIG. 7B. These results show that all of the points for PETN, and HMX, except for one of the 50 µg/cm$^2$ HMX points, are classified as RDX, i.e., as an explosive. The one 50 µg/cm$^2$ HMX point that is not classified as an explosive falls within the white light noise region. Therefore, the CIE-IR approach correctly classifies the unknowns HMX and PETN, which the CIE-IR chart is not trained for, as explosives. Thus, the CIE-IR chart can be successfully exploited for detection of multiple threats based on general spectroscopic properties associated with hazardous chemicals, without specific training.

It is also useful to determine how the CIE-IR chart would classify samples comprised of a mixture of a hazardous and a benign chemical. Therefore, inkjet-printed samples of RDX mixed with sugar on an aluminum substrate are examined, as well as RDX on the plastic delrin, an optically interfering substrate. CIE-IR results for the mixtures of RDX/sugar are presented in FIG. 8A. All RDX/sugar samples are a total combined concentration of 100 µg/cm$^2$ inkjet on an aluminum substrate. Inkjet-printed samples with 80/20, 50/50, and 20/80 (by mass) ratios of RDX/sugar are prepared, all with the sugar printed first and the RDX printed on top of the sugar layers.

Figure 8A:
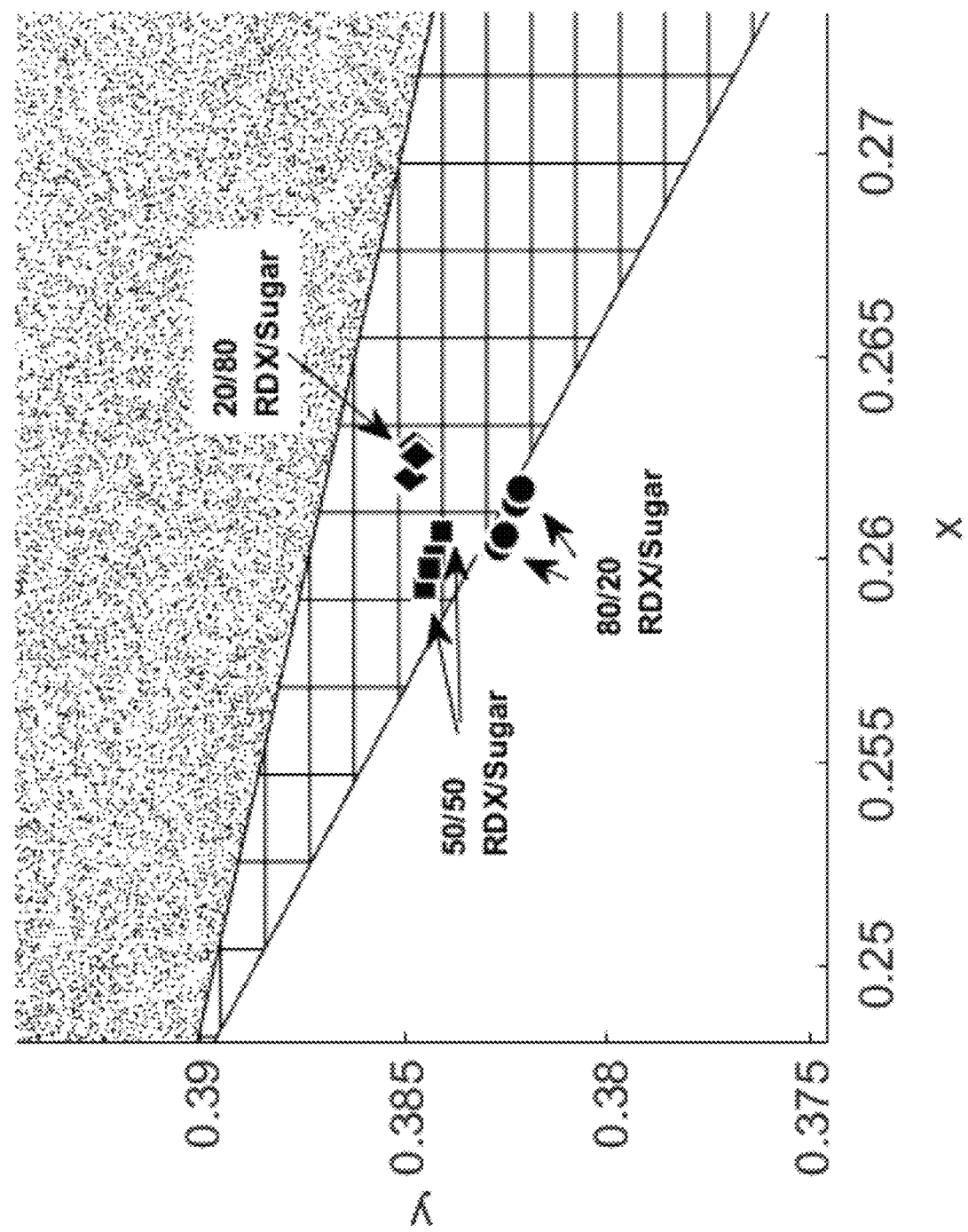
FIG. 8A depicts an expanded CIE-IR chart with RDX/sugar mixture test samples plotted. All RDX/sugar mixtures have a total surface concentration of 100 $\mu g/cm^2$. 80/20 RDX/sugar—circles, 50/50 RDX/sugar—squares, and 20/80 RDX/sugar—diamonds as indicated.

FIG. 8A demonstrates that the RDX/sugar mixtures fall between the RDX and sugar regions on the CIE-IR chart, as is analogous to color mixing described by the visible CIE chart. The 80/20 RDX/sugar mixtures (circles in FIG. 8A) are classified as RDX, with one exception which falls in the region between the RDX and sugar regions. As the concentration of RDX decreases and the relative amount of sugar increases, the resulting CIE-IR coordinates for the mixtures moves towards the sugar classification region. Based on the definition of this CIE-IR, the 50% RDX (squares) and 20% RDX (diamonds) mixtures are actually classified as AN, since the AN classification region lies between the RDX and sugar regions. While this means that these samples are technically misclassified from an absolute identification perspective, the CIE-IR chart correctly identifies the 50% RDX (squares) and 20% RDX (diamonds) mixtures as a hazardous chemical (explosive component AN). The results in FIG. 8a also demonstrate that the IR data in the CIE-IR chart behaves as color mixtures do on the visible CIE chart. Changes in the position of the CIE-IR points are sensitive to small compositional changes, as only 20 µg/cm$^2$ RDX placed on top of the sugar results in the CIE-IR coordinates for that mixture clearly in the AN classification region.

Classification of RDX inkjet-printed on the optically interfering substrate delrin provides an even greater discrimination challenge. RDX printed on delrin exhibits strong transaction, and thus, the resulting spectra are quite complex with spectral bands from both components at strongly varying ratios, including spectral band inversions.

Figure 8B:
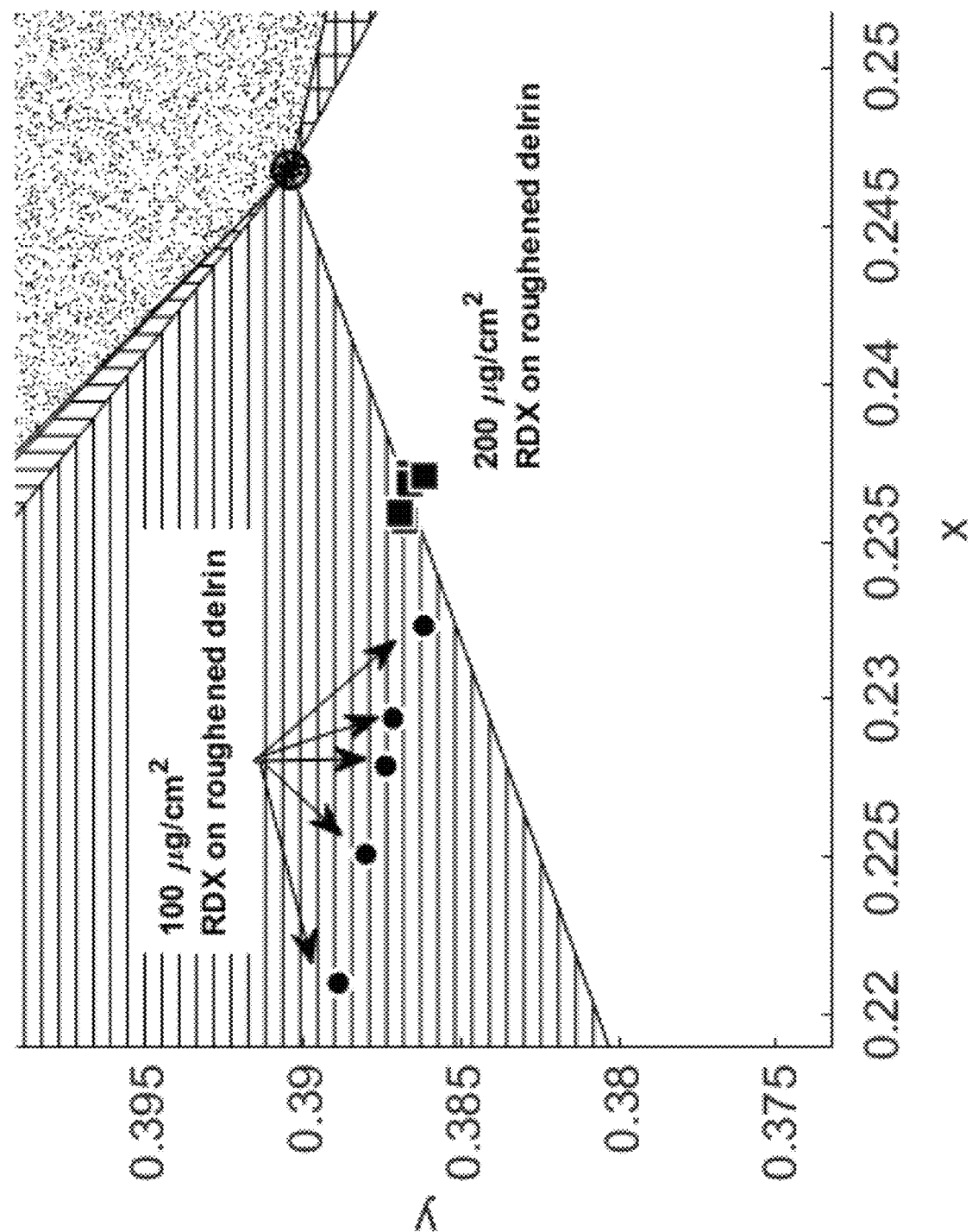
FIG. 8B depicts an expanded CIE-IR chart with additional test data of pure RDX inkjet printed on roughened delrin. Concentrations of 200 $\mu g/cm^2$ and 100 $\mu g/cm^2$ are shown as squares and circles as indicated.

The results in FIG. 8B demonstrate that, once again, samples that represent a mixture of two of the chemical classes behave similarly to that for human color vision described by the visible CIE chart. The 200 µg/cm$^2$ RDX on delrin points reside between the RDX and roughened delrin classification regions. Reducing the concentration of RDX on the surface to 100 µg/cm$^2$ moves the data points further into the roughened delrin classification region, similar to the results observed for the RDX/sugar mixtures. This again demonstrates that the CIE-IR chart is operating as expected, even for the challenging combined spectral signatures observed for these samples.

These results clearly demonstrate that the CIE-IR approach replicates human color vision in the infrared by utilizing IR filters, which act in the same fashion as the visible photopigments in the retina. This conclusively demonstrates that the CIE-IR approach enables the discrimination between hazardous and benign chemicals based on the interaction between IR filters and the IR properties of the chemicals. IR color vision optionally is further enhanced with additional human and machine learning inputs, such that the CIE-IR chart would be tailored for specific detection scenarios. As more data is used to train the CIE-IR chart, the regions defining the chemical classes could be more precisely defined. Human operators optionally enhance the classification when deployed, providing more intuitive user-defined classifications via false color imaging or other methods.

EXAMPLES

Defining the Cost of a CIE-IR Chart

The discriminating ability of any CIE-IR chart according to the instant invention is defined by at least two criteria: (1) the CIE-IR chart must be capable of separating the various chemical classes into distinct regions and (2) the larger the angular separation between the chemical classes on the CIE-IR chart, the more accurate that chart will be for correctly classifying unknown data. These two criteria are used to define the cost associated with a given CIE-IR chart. This cost value allows for comparing between two different CIE-IR charts; to determine which CIE-IR chart provides better discrimination based on these two criteria using the optimization routine described in the following section. CIE-IR charts with lower cost values meet these two criteria better than those with higher associated cost values.

Addressing criterion (1) is a two-step process. First, it is determined whether a given CIE-IR chart consisted of n regions where n=number of chemical classes, such that each region has one and only one chemical class present. This test is conducted using the mean x, y coordinate values for each chemical class, for example, using the following process.

Regions between the various chemical classes are assigned on the CIE-IR chart as follows. First, lines are drawn which separate between the various chemical classes. To do so, a radial line is drawn from the center white light point to the first point on the perimeter of the CIE-IR chart. This point corresponds to the lowest monochromatic IR wavenumber under study. Radial lines from the center white light point to the subsequent points on the perimeter of the CIE-IR chart are then drawn in sequence, until a region is formed that encompasses the mean x, y coordinates for one of the chemical classes. This process is then repeated, however now the starting point for the second region is the end of the first region. This process will result in n+1 separator lines, where n=number of chemical classes. These separator lines are used to define the potential boundaries between regions, which allow for separation between the chemical classes.

Though this process results in uniquely defined regions for each class, it also intrinsically defines those regions such that the mean x, y coordinates for each chemical class reside near the separator lines between the regions. Therefore, the actual regions for the CIE-IR chart are adjusted such that the mean value between each pair of separator lines is calculated and used to define the CIE-IR regions. This is conducted by calculating the mean monochromatic wavenumber positions between each pair of separator lines. The start of the first defined region is always associated with the lowest monochromatic IR wavenumber point. The end of this region is then defined by the mean monochromatic wavenumber position between separator line 1 and separator line 2. This process continues, where for the second region, the start of the region is defined by the end of region 1, while the end of region 2 is defined by the mean monochromatic wavenumber position between separator line 2 and separator line 3. This process continues until a unique region is defined for each chemical class on the CIE-IR chart.

Unique regions between the n chemical classes are defined. If this process results in <n uniquely defined regions, then the associated cost for the CIE-IR chart is set cost=1.5, and no further evaluation is conducted. If, however, n unique regions are defined for the mean x, y coordinates for n classes, then the CIE-IR chart is evaluated further.

The second step to address criterion (1) involved examining the individual training data x, y coordinate values independently. If any of the individual training data points are incorrectly classified (i.e. they do not reside in the region assigned to the underlying chemical class for that chemical), the cost of the CIE-IR chart is defined as in Equation 2.

$$\text{cost} = 0.5 + \frac{\text{Number of Training Samples Incorrectly Identified}}{\text{Total Number of Training Samples}} \quad \text{Eqn. 2}$$

Equation 2 will result in a cost value between 0.5 and 1.5, with a lower cost corresponding to a CIE-IR chart with more of the individual training data being correctly classified.

Criterion (1) prioritizes that a CIE-IR chart correctly identified all training data over trying to increase the angular separation between the chemical classes. If, after examining criterion (1), it is found that the CIE-IR chart correctly classifies all individual training data, then and only then is criterion (2) examined. In this instance, a different computation for the cost value is required. Therefore, rather than defining the cost as in Equation 4 above, the cost is calculated using Equation 3.

$$\text{cost} = 0.5 - \theta_{MIN} \quad (3)$$

In Equation 3, $\theta_{MIN}$=minimum angle between any two chemical classes, which is determined by calculating the angular separation between the mean x, y coordinates for each pair of n chemical classes, relative to a horizontal plane drawn through the CIE-IR chart. The largest possible angular separation between any two chemical classes is 180°. Therefore, the angle between all chemical classes are found by calculating the angle between each pair of chemical classes then dividing each by 180. Whichever pair of chemical classes exhibits the smallest angle is used as the value for $\theta_{MIN}$. This process results in a cost<0.5, with lower cost values corresponding to CIE-IR charts with greater angular separation between the chemical classes exhibiting the smallest angular separation. The minimum potential cost calculated using Equation 3 is dependent on the number of chemical classes, as the largest possible value for $\theta_{MIN}$=2/n, based on evenly dividing the CIE-IR chart. Thus for the studies presented here, with n=5, the minimum achievable cost=0.1, which would mean that the chemical classes are all separated by 72°. The actual angular separations between the regions and the associated cost is determined by the interaction between the training chemicals absorbance bands, and the filters and weighting matrix M used to generate the CIE-IR chart.

With these definitions, the cost for a CIE-IR chart directly corresponds with how well it meets the two defined discrimination criteria.

(1a.) If the CIE-IR chart is incapable of dividing then chemical classes into n unique regions, then the cost=1.5.

(1b.) If the CIE-IR chart is capable of dividing then chemical classes into n unique regions, however it results in at least one misclassified individual training data point, then the cost is calculated using Equation 2, resulting in 0.5<cost<1.5.

(2.) If the CIE-IR chart is capable of dividing then chemical classes into n unique regions, and it also correctly classifies all individual training data points (i.e., the result of Equation 4=0.5), then the cost is calculated using Equation 3, resulting in a cost<0.5.

Optimization Routine

Figure 9:
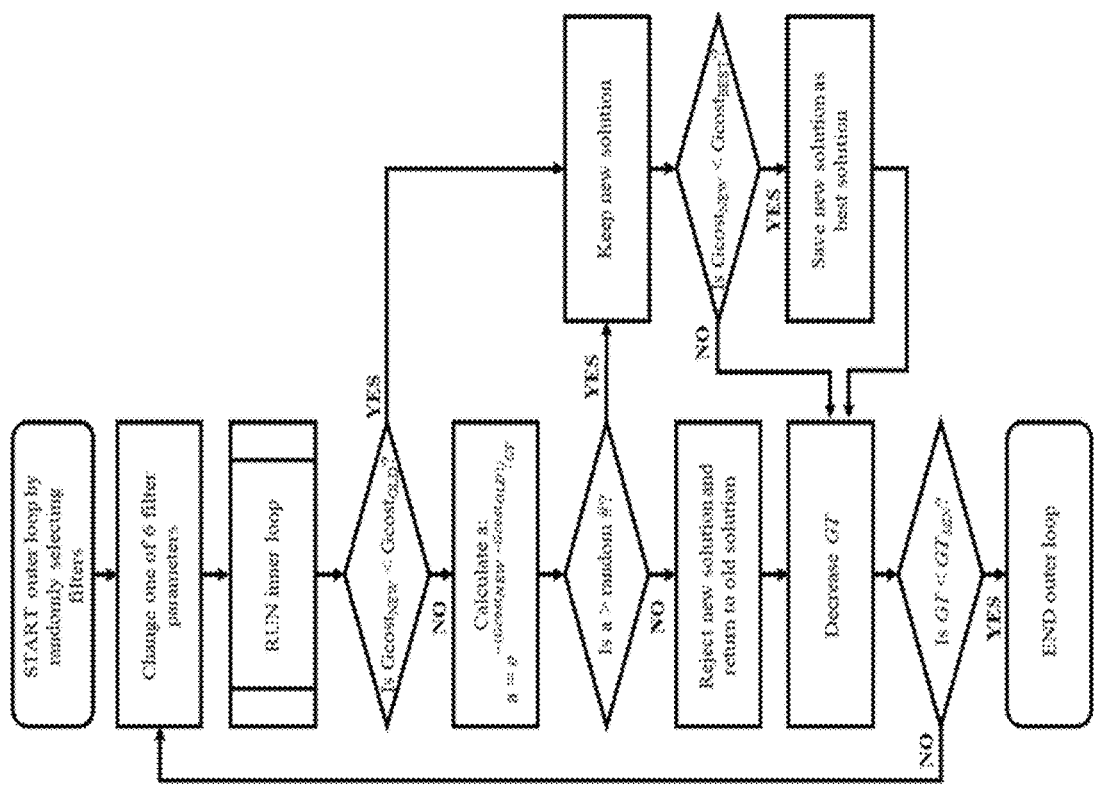
FIG. 9 is an illustrative flowchart for the outer global filter optimization loop according to an embodiment of the invention.

In order to optimize both the optical filter functions and weighting matrix used for the analysis, a standard nested simulated annealing approach is employed. (Although nested simulated annealing is described herein as a preferred global optimization algorithm, one of ordinary skill in the art will readily appreciate that alternative standard global and/or local optimization algorithms are included in alternative embodiments of the invention). Simulated annealing is a randomized probabilistic technique where the decision whether or not to keep a new solution is determined by both the cost of the new solution as well as a "temperature" variable T which is gradually decreased throughout the optimization. At high T, it is more likely that worse solutions will be kept, in order to reduce the chance of optimizing to a local, rather than a global, minimum. As T is lowered, the optimization routine will narrow to solutions that result in a lower cost. By employing a nested simulated annealing approach, both an internal T for the inner weighting function loop and a global temperature GT for the filter selection outer loop, shown by way of illustration in FIG. 9, are used. This is designed such that for each filter set, a full optimization of the weighting function is conducted. The goal of each iteration of the loop is to minimize the associated cost of the resulting CIE-IR chart as outlined in the previous section.

Prior to starting the optimization, Gaussian filter functions $F_L$, $F_M$, $F_S$ are randomly selected within a specified wavelength range, and with a specified full width at half maximum ("FWHM") value for each filter. One of the six filter parameters (i.e., the center wavelength position of one of the three filters or FWHM of one of the three filters) is changed, and the inner optimization loop is initialized. For the inner loop, the weighting matrix M is randomly populated at the start with values between 0 and 1. One of the nine parameters b1-b9 of the weighting matrix is randomly changed, and the resulting CIE-IR chart is generated. Mean x, y coordinates are calculated for each chemical class and plotted on the CIE-IR chart. If n regions (where n=number of chemical classes) can be defined on the CIE-IR chart that clearly separate between all given chemical classes, the optimization continues. If not, the new solution is rejected (cost=1.5).

If the solution is not rejected, the cost of the CIE-IR chart is calculated as described in the previous section and compared to the cost of the previous solution. Using standard simulated annealing rules:

1.) If new solution has a lower cost than the previous solution, keep the new solution.
2.) If the new solution has a higher cost than the previous solution, calculate a value, a, where $a = e^{-(new_{cost} - old_{cost})/T}$
3.) If a>random number between 0 and 1 keep the new solution.
4.) If a<random number between 0 and 1 reject the new solution.

The cost of the new solution is then compared to the best (i.e. lowest) cost calculated up to that point. If the new cost is lower than the previous best cost, the new solution is saved in memory as the best solution up to that point. The temperature T is decreased and the loop restarts using either the new solution as a starting point or returning to the old solution if the new solution is rejected. The inner loop continues until $T = T_{MIN}$. At this point, the inner loop is ended, and the best solution and associated best cost for this filter set are saved in memory to be compared to the cost of the previous filter set solution. This comparison also follows the standard simulated annealing rules outlined above. Again, the new global solution is also compared to the best global solution up to that point. The global temperature GT is decreased and the outer loop, shown by way of illustration in FIG. 9, restarts using either the new set of filter parameters as a starting point or returning to the old filter parameters if the new global solution is rejected. The optimization continues until the global temperature $GT = GT_{MIN}$. At this point, the best overall solution (lowest global cost) for the filter set and weighting matrix M is used to generate the final CIE-IR chart.

Figure 10:
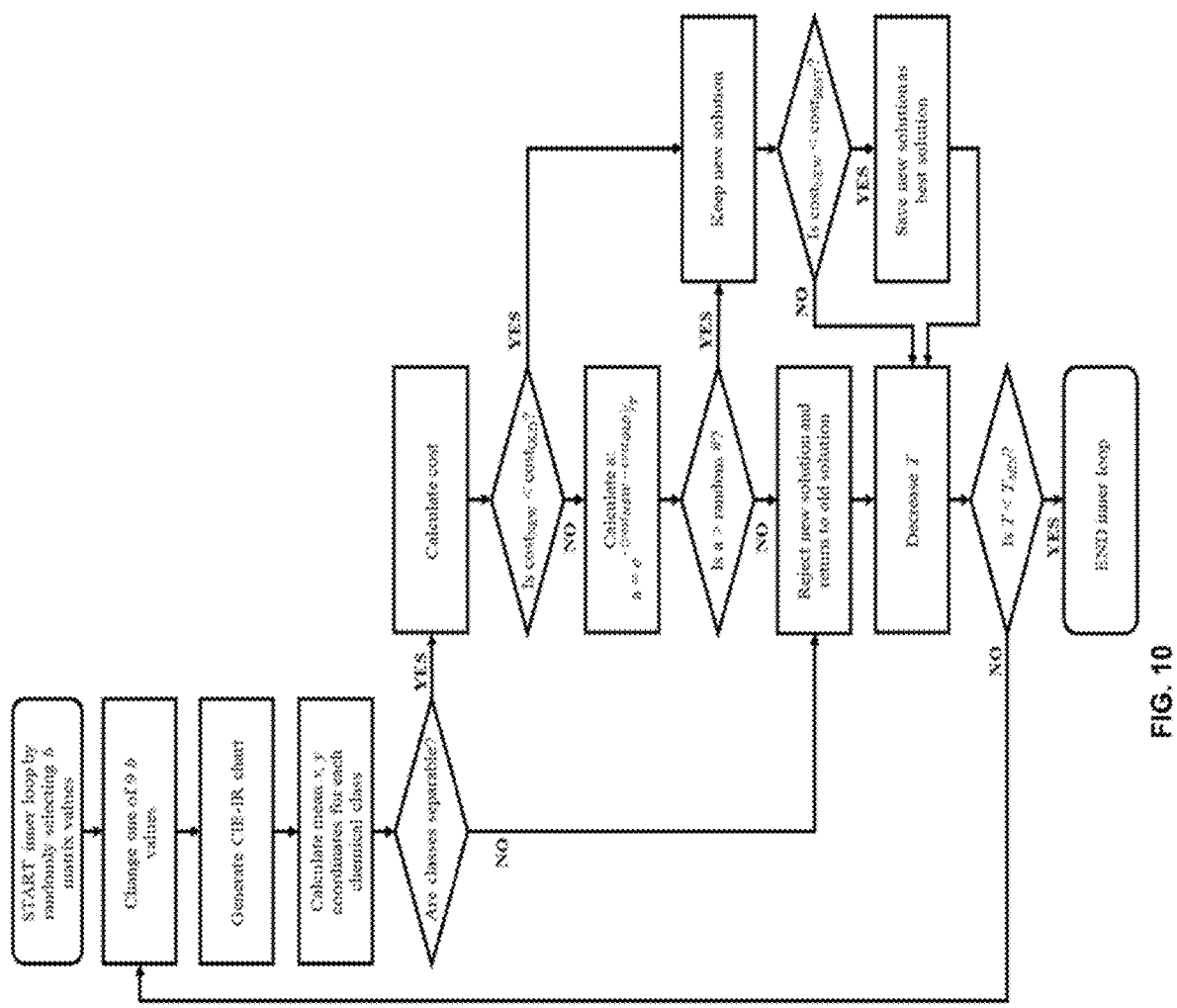
FIG. 10 is an illustrative flowchart for the inner weighting matrix M optimization loop according to an embodiment of the invention.

The optimization routine is presented as a set of flowcharts, demonstrating both the outer global filter optimization loop (shown by way of illustration in FIG. 9), and the inner loop (shown by way of illustration in FIG. 10), which optimizes the weighting matrix M for each filter set.

An embodiment of the invention comprises a computer program instructions, which computer program instructions embody the steps, functions, filters, and/or subsystems described herein. However, it should be apparent that there could be many different ways of implementing the invention in computer programming, and the invention should not be construed as limited to any one set of computer program instructions. Further, a skilled programmer would be able to write such a computer program to implement an exemplary embodiment based on the appended diagrams and associated description in the application text. Therefore, disclosure of a particular set of program code instructions is not considered necessary for an adequate understanding of how to make and use the invention. The inventive functionality of the claimed computer program will be explained in more detail in the following description read in conjunction with the program flow in the embodiments of the invention described above.

One of ordinary skill in the art will recognize that the methods, systems, and control laws discussed above may be implemented in software as software modules or instructions, in hardware (e.g., a standard application-specific integrated circuit ("ASIC")), or in a combination of software and hardware. The methods, systems, and control laws described herein may be implemented on many different types of processing devices by program code comprising program instructions that are executable by one or more processors. The software program instructions may include source code, object code, machine code, or any other stored data that is operable to cause a processing system to perform methods described herein.

The methods, systems, and control laws may be provided on many different types of standard computer-readable media including standard computer storage mechanisms (e.g., CD-ROM, diskette, RAM, flash memory, computer's hard drive, etc.) that contain instructions for use in execution by a standard processor to perform the methods' operations and implement the systems described herein.

The computer components, software modules, functions and/or data structures described herein may be connected directly or indirectly to each other in order to allow the flow of data needed for their operations. It is also noted that software instructions or a module can be implemented for example as a subroutine unit or code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

Systems and methods disclosed herein may use data signals conveyed using networks (e.g., local area network, wide area network, interne, etc.), fiber optic medium, carrier waves, wireless networks, etc. for communication with one or more data-processing devices. The data signals can carry any or all of the data disclosed herein that is provided to or from a device.

Although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

As used herein, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

All documents mentioned herein are hereby incorporated by reference for the purpose of disclosing and describing the particular materials and methodologies for which the document was cited.

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

What is claimed as new and desired to be protected by Letters Patent of the United States is:

1. An apparatus comprising:
   a light source in operation illuminating at least one chemical of interest, and
   at least three optical bandpass filters with spectral overlap sufficient to generate a chromaticity chart, said at least three optical bandpass filters in operation receiving light at least one of reflected from and transmitted through the chemical of interest the chemical of interest comprising a plurality of chemical vibrational absorption-emission bands, said at least three optical bandpass filters comprising at least three respective spectral responses, the plurality of stimulus-value signals being based on the at least three respective spectral responses and the plurality of chemical vibrational absorption-emission bands;
   a processor in operation receiving a plurality of stimulus-value signals;
   at least one electromagnetic receiver in operation communicating with said at least three bandpass filters and said processor, said at least three optical bandpass filters transmitting the plurality of stimulus-value signals to said at least one electromagnetic receiver, said at least one electromagnetic receiver transmitting the plurality of stimulus-value signals to said processor; and
   a non-transitory computer-readable medium storing instructions that, when executed by said processor, cause said processor to carry out a method for identifying the at least one chemical of interest, the method comprising:
      generating the chromaticity chart comprising a plurality of chemical groupings;
      classifying the at least one chemical of interest as belonging to a respective chemical grouping of the plurality of chemical groupings based on the chromaticity chart and the plurality of stimulus-value signals,
   wherein said generating a chromaticity chart comprises:
      providing at least three vibrational-color-matching functions, the at least three vibrational-color-matching functions comprising at least three respective weighted linear transforms of the plurality of stimulus-value signals; and
      generating the plurality of chemical groupings based on the at least three vibrational-color-matching functions.

2. The apparatus according to claim 1, wherein said generating the plurality of chemical groupings based on the at least three vibrational-color-matching functions comprises:
   generating a plurality of molecular vibrational chromaticity regions respectively corresponding to the plurality of chemical groupings;
   adjusting at least one of the plurality of chemical groupings and the at least three respective weighted linear transforms until the plurality of molecular vibrational chromaticity regions correspondingly include a plurality of target chemicals.

3. The apparatus according to claim 2, wherein the vibrational-color-matching functions receive as inputs the plurality of stimulus-value signals, the vibrational-color-matching functions outputting a plurality of molecular vibrational chromaticity coordinates.

4. The apparatus according to claim 3, wherein said classifying the chemical of interest as belonging to a respective chemical grouping of the plurality of chemical groupings comprises:
   determining a respective vibrational chromaticity region of the plurality of molecular vibrational chromaticity regions based on the plurality of vibrational chromaticity coordinates; and
   determining the respective chemical grouping of the plurality of chemical groupings based on the respective vibrational chromaticity region of the plurality of vibrational chromaticity regions.

5. The apparatus according to claim 1, wherein said at least three optical bandpass filters comprise one of at least three IR bandpass filters and at least three Raman bandpass filters.

6. An apparatus comprising:
   a light source in operation illuminating at least one chemical of interest,
   at least three active polychromatic active sources illuminating the chemical of interest, said at least three active sources comprising at least three respective spectral responses, said at least three respective response comprising spectral overlap sufficient to generate a chromaticity chart;
   a processor in operation receiving a plurality of stimulus-value signals;
   an electromagnetic receiver receiving light at least one of reflected from and transmitted through the chemical of interest, the chemical of interest comprising a plurality of chemical vibrational absorption bands, the plurality of stimulus-value signals being based on the at least three respective spectral responses and the plurality of chemical vibrational absorption bands, said electromagnetic receiver transmitting the plurality of stimulus-value signals to said processor; and a non-transitory computer-readable medium storing instructions that, when executed by said processor, cause said processor to carry out a method for identifying the at least one chemical of interest, the method comprising:
generating the chromaticity chart comprising a plurality of chemical groupings;
classifying the at least one chemical of interest as belonging to a respective chemical grouping of the plurality of chemical groupings based on the chromaticity chart and the plurality of stimulus-value signals,
wherein the chemical of interest comprises chemical vibrational absorption bands,
wherein said generating the chromaticity chart comprises:
providing at least three vibrational-color-matching functions, the at least three vibrational-color-matching functions comprising at least three respective weighted linear transforms of the plurality of stimulus-value signals; and
generating the plurality of chemical groupings based on the at least three vibrational-color-matching functions.

7. The apparatus according to claim 6, wherein said generating the plurality of chemical groupings based on the at least three vibrational-color-matching functions comprises:

generating a plurality of molecular vibrational chromaticity regions respectively corresponding to the plurality of chemical groupings;
adjusting at least one of the plurality of chemical groupings and the at least three respective weighted linear transforms until the plurality of molecular vibrational chromaticity regions correspondingly include a plurality of target chemicals.

8. The apparatus according to claim 7, wherein the vibrational-color-matching functions receive as inputs the plurality of stimulus-value signals, the vibrational-color-matching functions outputting a plurality of vibrational chromaticity coordinates.

9. The apparatus according to claim 8, wherein said classifying the chemical of interest as belonging to a respective chemical grouping of the plurality of chemical groupings comprises:
determining a respective vibrational chromaticity region of the plurality of molecular vibrational chromaticity regions based on the plurality of vibrational chromaticity coordinates; and
determining the respective chemical grouping of the plurality of chemical groupings based on the respective vibrational chromaticity region of the plurality of vibrational chromaticity regions.

* * * * *